E. L. WITTE.
DRUGGISTS' GRADUATED MEASURES.
No. 179,383.  Patented June 27, 1876.
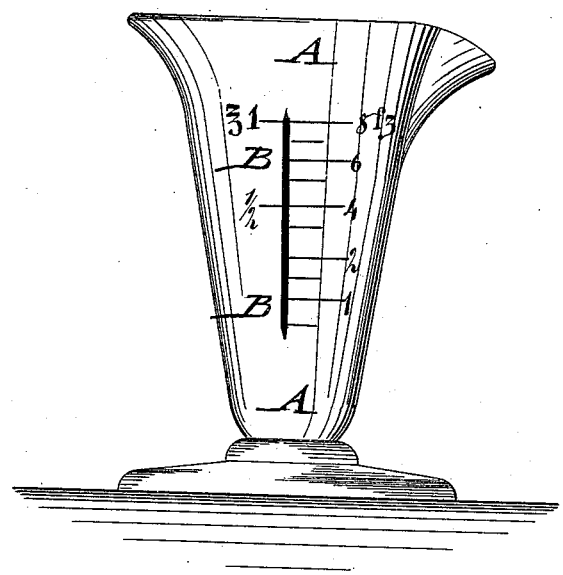

UNITED STATES PATENT OFFICE.

EDWARD L. WITTE, OF WHITE MILLS, PENNSYLVANIA.

IMPROVEMENT IN DRUGGISTS' GRADUATED MEASURES.

Specification forming part of Letters Patent No. 179,383, dated June 27, 1876; application filed February 14, 1876.

*To all whom it may concern:*

Be it known that I, EDWARD L. WITTE, of White Mills, Wayne county, Pennsylvania, have invented a new and Improved Druggist's Graduate, of which the following is a specification:

The accompanying drawing represents a side elevation of my improved druggist's graduate.

My invention relates to an improved druggist's graduate, in which the required quantity may be measured with great facility, and the graduation more clearly and distinctly seen than in the graduates at present in general use.

The disadvantage of the common graduate or measuring vessel is that its scale or graduation is cut into the glass, and frequently, and especially in the evening and in dark rooms, only visible with considerable difficulty, necessitating the holding of the vessel repeatedly toward the light to determine the proper quantity. This renders the working with the graduate annoying and time-consuming, and prevents that degree of accuracy required for compounding medical preparations.

The invention is designed to avoid these defects, and to provide a graduate on which the scale is seen in perfectly distinct manner, by having the scale or graduations burned in black color in the glass.

In the drawing, A represents a druggist's graduate or measuring-vessel, which is made in the customary shape and size, and provided at the sides with a graduation or scale that is not cut into the glass, but painted and burned with a fire-proof black or other color into the same, so that any quantity may be quickly measured therein with accuracy and facility. Mistakes are thereby avoided, and the use of the graduate rendered easier and more convenient, the scale retaining its efficacy as long as the vessel is in use, as the color being burned into the glass cannot be worn off or destroyed by acids, &c.

The graduate forms a superior article for drug-stores, laboratories, and other purposes, on account of its practical advantages.

Having thus described my invention, I claim as new and desire to secure by Letters Patent—

A druggist's graduate or measuring-vessel, having the scale or graduation burned into the glass in black or other color to be clearly and readily distinguishable, substantially as specified.

EDW. L. WITTE.

Witnesses:
C. C. JADWIN,
L. F. DORFLINGER.